United States Patent [19]

Horiuchi

[11] Patent Number: 4,965,616
[45] Date of Patent: Oct. 23, 1990

[54] AUTOMATIC LOADING CAMERA WITH CLAW SPOOL

[75] Inventor: Tohru Horiuchi, Tokyo, Japan
[73] Assignee: Konica Corporation, Tokyo, Japan
[21] Appl. No.: 313,836
[22] Filed: Feb. 23, 1989

[30] Foreign Application Priority Data

Feb. 26, 1988 [JP] Japan .................. 63-44755

[51] Int. Cl.⁵ ................... G03B 1/04; G65H 75/28
[52] U.S. Cl. ................... 354/212; 242/71; 242/74
[58] Field of Search .......... 354/212, 214; 242/71, 242/71.1, 71.4, 71.5, 74

[56] References Cited

U.S. PATENT DOCUMENTS

| | | | |
|---|---|---|---|
| 3,450,366 | 6/1969 | Goldberg | 242/74 |
| 4,600,286 | 7/1986 | Harvey | 242/74 |
| 4,609,163 | 9/1986 | Kimura et al. | 242/71 |
| 4,623,232 | 11/1986 | Wong et al. | 354/212 |

FOREIGN PATENT DOCUMENTS

| | | | |
|---|---|---|---|
| 424211 | 8/1947 | Italy | 242/74 |
| 376964 | 11/1959 | Switzerland | 242/74 |

*Primary Examiner*—A. A. Mathews
*Attorney, Agent, or Firm*—Finnegan, Henderson, Farabow, Garrett and Dunner

[57] ABSTRACT

A spool driving type automatic loading camera with a claw spool includes at least one claw portion and a projecting step portion. The claw portion is formed on an outer circumferential surface of a film winding spool and engages with a perforation of a leader portion of a film. The projecting step portion is formed at a portion other than the claw in a circumferential direction and outside the claw.

4 Claims, 4 Drawing Sheets

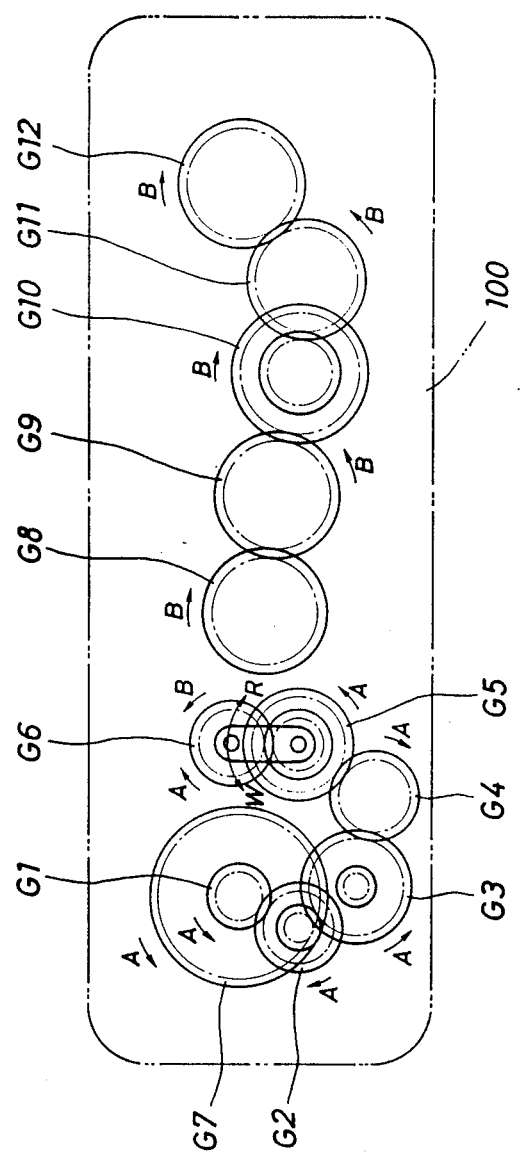

AUTOMATIC LOADING CAMERA WITH CLAW SPOOL

BACKGROUND OF THE INVENTION

The present invention relates to an automatic loading camera capable of automatically loading 35-mm film (J135 roll film).

An automatic loading camera employs two types of film feeding systems. One system is a sprocket driving system in which a sprocket gear meshing with perforations of a film is driven to feed the film toward a spool mounted in a camera so that the film is wound on the spool. The other is a spool driving system in which a spool is driven to wind the film at the same time the film is fed.

In the sprocket driving system, a spool must wind a film at a speed corresponding to the feed speed of the film fed by a sprocket gear. Therefore, in order to respond to an increase in winding diameter, a known slipping mechanism utilizing friction must be located between the spool and a spool shaft, resulting in a complicated mechanism. In addition, since a large rotating force must be transmitted to the spool shaft to overcome the friction, a power loss is increased.

On the contrary, the spool driving system does not require the above slipping mechanism nor a sprocket driving mechanism. Therefore, a structure of the system is simplified, and a rotating force to be transmitted to the spool can be relatively small. For this reason, the spool driving system is suitable for a small and inexpensive compact camera.

Systems for winding a film on a spool can be classified into two classes: a friction system for winding a film by utilizing a frictional force; and a claw system in which a claw is formed on a spool and meshes with a perforation of a film. In the friction system, since an urging member having a large urging force is required to satisfactorily utilize a frictional force between a film and a spool, a power loss is larger than that in the claw system. Therefore, the claw winding system is generally used in combination with a spool driving system. A combination of the two systems will be referred to as a spool driving system hereinafter.

In the claw-type spool driving system, however, a perforation of a film leader portion must be engaged with and fixed to a claw formed on a spool circumferential surface. Precision of such a film loading operation depends on an operator's skill. Therefore, film winding is sometimes started while the film leader portion is incompletely fixed.

Even when a film is completely engaged with the claw, a film leader portion floating from the spool circumferential surface is pushed by the surface of the film to be subsequently wound for a second turn when the spool rotates once. As a result, the perforation is easily disengaged from the claw.

Even when the claw is not disengaged from the perforation, the film floats from the spool circumferential surface to cause a so-called loose winding state. As a result, the film extends in a film winding chamber and rubs against wall surfaces of the chamber, thereby disabling film winding.

SUMMARY OF THE INVENTION

It is an object of the present invention to solve the above conventional problems and to provide an automatic loading camera with a claw spool, in which a film is reliably wound on a spool in tight contact therewith.

The above object of the present invention is achieved by an automatic loading camera with a claw spool, comprising at least one claw, formed on the outer circumferential surface of a spool, for engaging with a perforation of a leader portion of a film to be used, and a step portion formed along a circumferential direction except for the claw and projecting outside the claw.

According to the present invention, a predetermined portion of a spool circumferential surface projects, and a space for receiving a film leader portion is formed between the spool circumferential surface and a film surface of a second turn by forming a step portion on the outer circumferential surface of the spool, thereby preventing an external force from acting to disengage the film leader portion from the claw.

BRIEF DESCRIPTION OF THE DRAWINGS

FIG. 5 is a view showing an arrangement of a driving system of the camera main body.

DETAILED DESCRIPTION OF THE PREFERRED EMBODIMENTS

An embodiment of the present invention will be described below with reference to the accompanying drawings.

Figure 1:
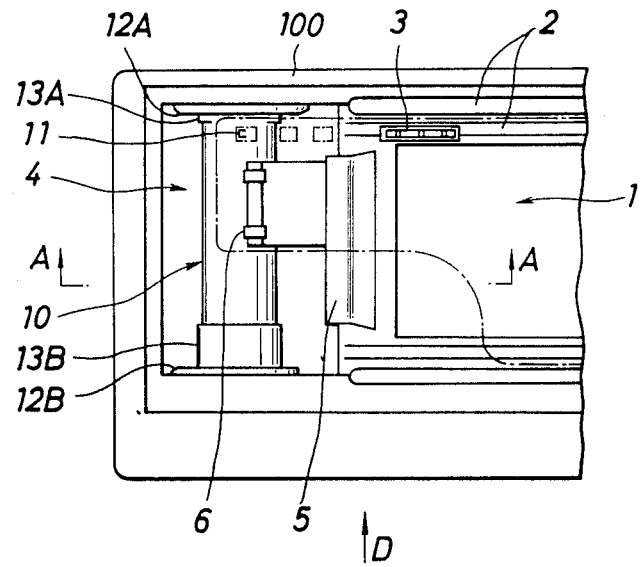
FIG. 1 is a rear view of a main part of an automatic loading camera main body according to the present invention.

FIG. 1 shows a main part of a rear surface of a camera main body 100 of an automatic loading camera according to the present invention. Referring to FIG. 1, reference numeral 1 denotes an exposure frame; 2, film guide rails formed at both sides of the exposure frame 1; 3, a sprocket gear; 4, a film wiNding chamber; and 5 and 6, a film guide member and a film urging roller extending in the film winding chamber 4.

Reference numeral 10 denotes a film winding spool fitted on and fixed integrally with a film winding shaft extending through the film winding chamber 4. The spool 10 includes a pair of hook claws 11, formed on symmetrical positions on its circumferential surface, for engaging with a perforation of a leader portion (indicated by an alternate long and dashed line) of a film to be loaded.

The spool 10 also includes a pair of projecting step portions 13A. The steps portions 13A are in contact with a proximal portion of a flange 12A outside the claws 11 and are formed at symmetrical positions on the circumferential surface except for the claws 11 so as to continue in the circumferential direction via inclined surfaces.

An overall circumferential surface 13B which is in contact with a proximal portion of the other flange 12B has the same height as that of each step portion 13A from the circumferential surface of the spool 10, so that a film is wound parallel to the axis of the spool 10. The height of each claw 11 from the circumferential surface of the spool 10 is preferably higher than that of each step portion 13A by the thickness of a film. More specifically, each claw 11 is preferably higher than each step portion 13A by 0.1 to 0.3 mm.

Figure 2:
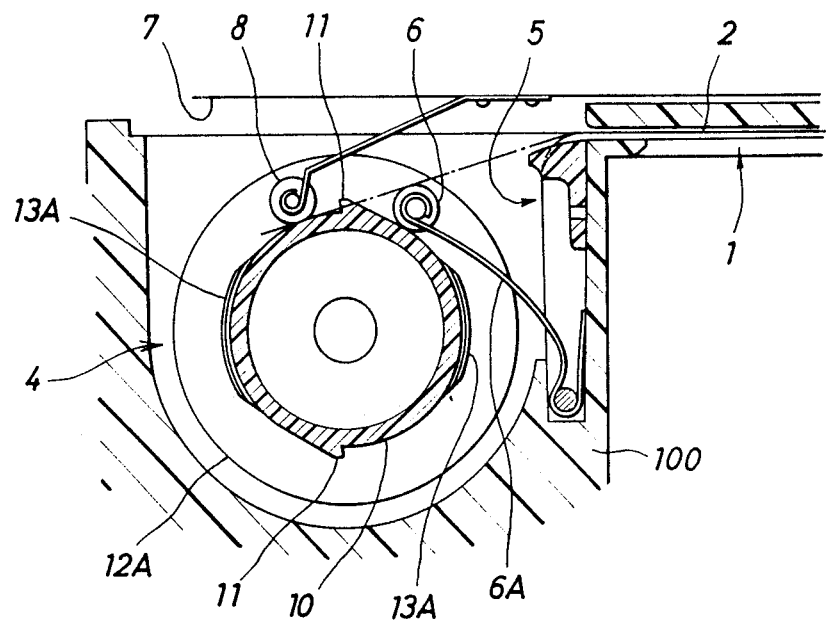
FIG. 2 is a sectional view of the main part of the camera.

A film loading operation will be described below with reference to FIG. 2 taken along a line A—A in FIG. 1.

When the end of a leader portion (indicated by an alternate long and dashed line) of a film is placed on the spool 10 and a rear cover 7 is closed, an urging roller 8 mounted on the rear cover 7 urges the leader portion against the spool.

When the spool 10 starts rotating counterclockwise upon operation of a driving system of the winding shaft to be described later, the claws 11 engage with perforations. When the leader portion rotates together with the circumferential surface of the spool 10 through almost 360°, the end of the leader portion abuts against a film guide 6A of the urging roller 6 formed at the camera main body 100 side.

Since the film guide 6A is formed to guide the end of the leader portion along the circumferential direction of the spool 10, the film can be smoothly and reliably guided toward a contact surface between the spool 10 and the urging roller 6.

The end of the leader portion urged against the circumferential surface of the spool 10 by the urging roller 6 is guided into a contact portion between the circumferential surface of the spool 10 and a second turn of the film. In this case, since the spool 10 used in the present invention has the step portions 13A as described above, a satisfactory clearance is formed between the circumferential surface of the spool 10 and the second turn of the film to allow the leader portion to enter therein. As a result, the leader portion is not adversely affected by any external force, and second and subsequent turns of the film can be formed while engagement between the perforations and the claws 11 is assured. The step portions 13A prevent perforations of second and subsequent turns of the film from engaging with the claws 11.

The step portion 13B is formed so that the film other then the film leader portion is stably wound after the leader portion is reliably wound on the spool 10.

Figure 3:
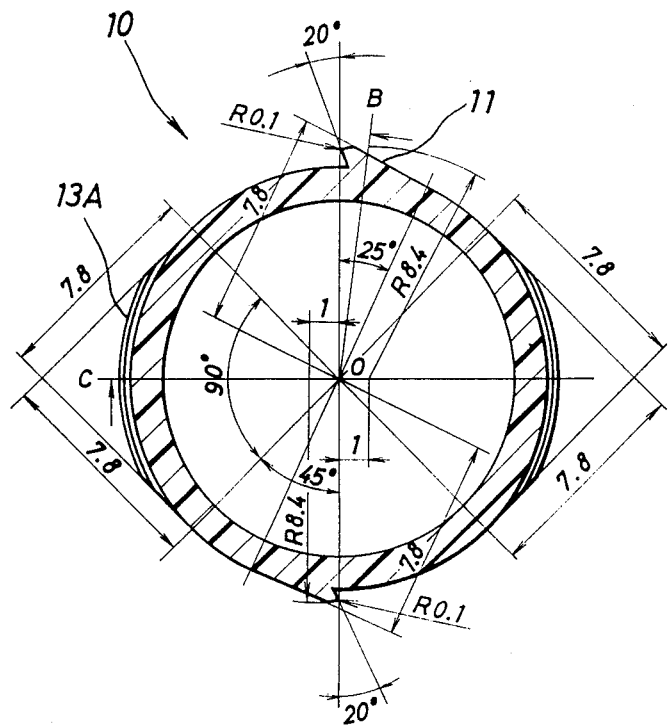
FIGS. 3 and 4 are sectional views showing a spool of the camera.
Figure 4:
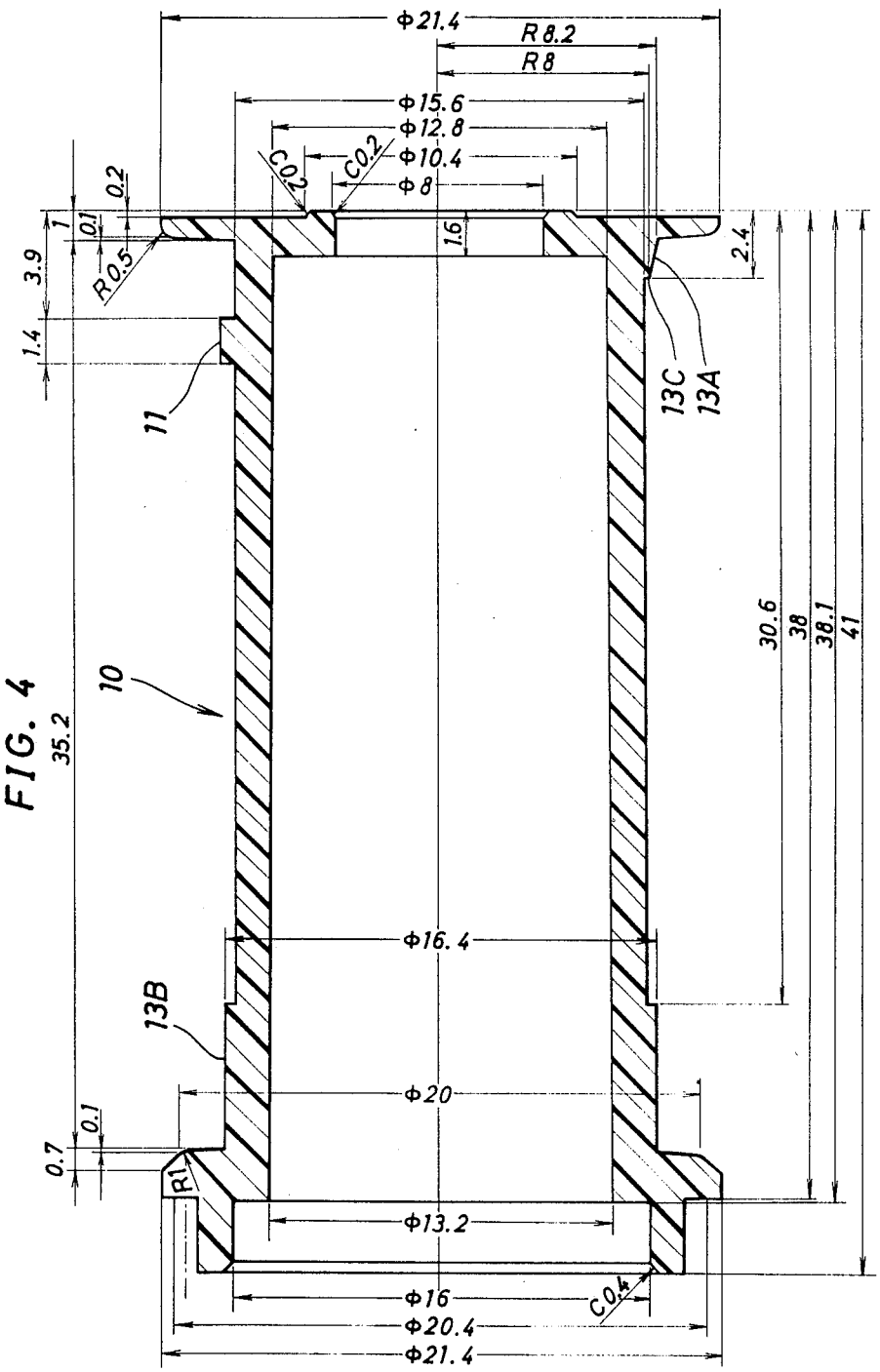

FIG. 3 is a sectional view showing the spool 10, and FIG. 4 is a sectional view taken along a line B - O - C in FIG. 3. In FIGS. 3 and 4, numerals (unit: mm) are set values of the present invention.

The height of the circumferential surface of each step portion 13A is increased higher outwardly to form an inclination, i.e., a taper. Therefore, when a film is loaded while the leader portion is overlapped on the step portions 13A, the end of the leader portion is pushed toward the center of the spool 10 by the step portions 13A so as to be received in the clearance upon film winding of a second turn. As shown in FIG. 4, each step portion 13A has a step 13C. Each step 13C prevents the end of the film leader portion from returning onto the corresponding step portion 13A after it is received at a proper position of the spool 10. Although this embodiment includes two claws, the present invention is not limited to this embodiment. For example, in consideration of a film hardness, curling, a film extracting amount upon patrone loading or the like, one or a plurality of the claws 11 may be used.

A power for rotating the spool 10 is transmitted by a driving system shown in FIG. 5.

FIG. 5 is a view showing an arrangement of the driving system viewed from a direction indicated by an arrow D in FIG. 1.

Referring to FIG. 5, reference symbol G1 denotes a gear mounted on a motor (not shown) located inside the spool 10. Gears G2, G3, G4 and G5 have pivotal centers fixed with respect to the camera main body 100 and include stepped gears. The gears G1 to G5 normally mesh with each other so that rotation of the gear G1 is transmitted to the gear G5 while its speed is reduced via the gears G2, G3 and G4. Reference symbol G7 denotes a gear directly connected to the spool 10.

A gear G12 is mounted on a rewind shaft (not shown), and gears G8, G9, G10 and G11 have pivotal centers fixed with respect to the camera main body 100 and include stepped gears. The gears G8 to G12 normally mesh with each other so that rotation of the gear G8 is transmitted to the gear G12 via the gears G9, G10 and G11.

The gear G6 has a planetary mechanism and therefore can pivot about the rotational center of the gear G5 while it meshes with the gear G5. If the motor rotates in the forward direction to rotate the gear G1 in an arrow A direction, this rotation rotates the gear G6 in an arrow direction via the gears G2, G3, G4 and G5 and moves the rotational center of the gear G6 in an arrow (W) direction. Therefore, the gear G6 meshes with the gear G7, and rotation in the A direction of the gear G6 is transmitted to the gear G7. As a result, the spool 10 rotates in the A direction to wind a film. At this time, the gears G8 to G12 keep racing via the rewind shaft driven by rotation of a patrone shaft.

When the motor starts rotating in the reverse direction (opposite to the A direction) by a film rewind operation or a signal detecting the operation, the gear G6 is moved in an arrow R direction and meshes with the gear G8, and the gear G12 rotates in an arrow B direction to rewind the film. At this time, the gear G7 races to continuously rotate the spool 10 in the direction opposite to the arrow A, thereby feeding the wound film toward the rewind shaft. The motor is rotated by operating the camera after a patrone is loaded, thereby starting automatic loading. In this case, a time required for the claws 11 to engage with perforations may be set beforehand, so that the motor is rotated at low speed for this time period and rotated at high speed thereafter. As a result, the claws can be engaged more reliably with the perforations of the film.

According to the present invention, a winding spool capable of reliably winding a leader portion of a film upon automatic loading and tightly winding a photographed film without bending or damaging the film can be realized. As a result, there is provided an automatic loading camera with a claw spool which can be easily operated and can perform automatic loading at a high percentage of success.

What is claimed is:

1. A spool driven, claw winding automatic loading camera, comprising:
    a film winding spool disposed in the camera for rotation about an axis, the spool including an outer circumferential surface and opposed axial ends;
    at least one claw portion projecting from the outer circumferential surface of the spool and being disposed to engage perforations in a leader portion of a film roll; and
    at least one step portion projecting from the outer circumferential surface of the spool and being axially positioned between the at least one claw portion and one of the opposed ends.

2. The camera of claim 1 wherein the outer circumferential surface includes two claw portions projecting therefrom at generally symmetrical, radially opposed positions on said film winding spool, and two of the stepped portions projecting therefrom at generally symmetrical, radially opposed positions between the radially opposed claw portions.

3. The camera of claim 1 wherein the at least one step portion includes an upper surface which tapers towards the outer circumferential surface.

4. An automatic loading camera having a spool driven system and a claw winding system, comprising:
   a cylindrical winding spool located in a film winding chamber formed in the camera, the winding spool having opposed axial ends and having a continuous circumferential outer surface for rotatively receiving a leader portion of a roll of film;
   a plurality of hook claws circumferentially spaced from each other and projecting from the continuous outer surface to a first distance, the claws being positioned in spaced proximity to one axial end of said spool for engaging perforations in the leader portion of the roll of film; and
   a plurality of step portions circumferentially spaced from each other and projecting from the outer surface to a second distance, the step portions being positioned axially between the claws and the one axial end to prevent film perforations from engaging the hook claws after the film has made one revolution about the winding spool, said step portions having an upper surface tapered toward said outer surface inwardly from the one axial end to guide the leader portion of the film toward a center of the cylindrical winding spool.

* * * * *